(12) United States Patent
Hirokawa et al.

(10) Patent No.: US 7,568,449 B2
(45) Date of Patent: Aug. 4, 2009

(54) FREESTANDING PET BARRIER

(75) Inventors: Satoshi Hirokawa, Toyama (JP); Orie Tani, Toyama (JP)

(73) Assignee: Richell U.S.A., Inc., Arlington, TX (US)

( * ) Notice: Subject to any disclaimer, the term of this patent is extended or adjusted under 35 U.S.C. 154(b) by 540 days.

(21) Appl. No.: 11/280,790

(22) Filed: Nov. 16, 2005

(65) Prior Publication Data

US 2006/0107901 A1    May 25, 2006

(30) Foreign Application Priority Data

Nov. 24, 2004  (JP) .............................. 2004-338416

(51) Int. Cl.
*A01K 1/03*  (2006.01)
*E06B 3/68*  (2006.01)
*E06B 7/00*  (2006.01)
*E06B 9/01*  (2006.01)

(52) U.S. Cl. ......................................... 119/452; 49/55

(58) Field of Classification Search ................ 119/452, 119/484; 49/50, 55, 57; D6/331, 332, 391; 256/65.01, 65.11, 65.12, 65.13, 73, 24, 25
See application file for complete search history.

(56) References Cited

U.S. PATENT DOCUMENTS

| | | | | | |
|---|---|---|---|---|---|
| 1,799,308 | A | * | 4/1931 | Matthiesen et al. ............ | 52/507 |
| 4,777,765 | A | * | 10/1988 | Johnson, Jr. .................... | 49/55 |
| 6,112,461 | A | * | 9/2000 | Cheng ............................ | 49/55 |
| 6,123,321 | A | * | 9/2000 | Miller .......................... | 256/25 |
| 6,161,334 | A | * | 12/2000 | Goodin ......................... | 49/125 |
| 6,581,914 | B2 | * | 6/2003 | Saura Sotillos et al. ....... | 256/73 |
| 2001/0011406 | A1 | * | 8/2001 | Nakamoto et al. ............. | 16/271 |

FOREIGN PATENT DOCUMENTS

| | | |
|---|---|---|
| JP | 48-29652 | 9/1973 |
| JP | 48 29652 | 9/1973 |
| JP | 54-98754 | 7/1979 |
| JP | 54 98754 | 7/1979 |
| JP | 07-173891 | 7/1995 |
| JP | 929649 | 7/1995 |
| JP | 07-285775 | 10/1995 |
| JP | 1087801 | 10/2000 |

(Continued)

OTHER PUBLICATIONS

Richell Corporation, Pet sitter gate picture taken from sales catalog, 2003-2004, issued in Feb. 2003.

(Continued)

*Primary Examiner*—Michael R Mansen
*Assistant Examiner*—Monica L Williams
(74) *Attorney, Agent, or Firm*—Conley Rose, P.C.

(57) ABSTRACT

A self-supporting pet barrier comprising a front panel and two side panels, each panel having floor-contacting surfaces preferably to which a friction reducing substance has been applied is disclosed. The front and side panels preferably are attached so that the side panels can be positioned from generally perpendicularly to the front panel in use to a folded position adjacent said front panel for storage or travel. A generally triangular stabilizing leg may protrude forward from the plane of the front panel and can be attached in either the side panel or front panel.

36 Claims, 10 Drawing Sheets

| | FOREIGN PATENT DOCUMENTS | |
|---|---|---|
| JP | 1087802 | 10/2000 |
| JP | 1087937 | 10/2000 |
| JP | 2001-008604 | 1/2001 |
| JP | 1122773 | 10/2001 |
| JP | 1137270 | 3/2002 |
| JP | 1169549 | 4/2003 |
| JP | 1169773 | 4/2003 |
| JP | 1170082 | 4/2003 |
| JP | 3467626 | 5/2003 |
| JP | 1174314 | 6/2003 |

OTHER PUBLICATIONS

Patent abstract and partial translation, JP07-173891.
Patent abstract and partial translation, JP07285775.
Patent abstract and partial translation, JP2001-008604.
Patent abstract and machine translation, JP2004-242649.
Partial translation, JP3467626.

* cited by examiner

FREESTANDING PET BARRIER

CROSS REFERENCE TO RELATED APPLICATIONS

This application claims priority under 35 U.S.C. § 119 to patent application Ser. No. 2004-338416, entitled Freestanding Pet Gate, filed with the Japan Patent Office on Nov. 24, 2004, under the Paris Convention for the Protection of Industrial Property.

STATEMENT REGARDING FEDERALLY SPONSORED RESEARCH OR DEVELOPMENT

Not applicable.

REFERENCE TO A MICROFICHE APPENDIX

Not Applicable.

FIELD OF THE INVENTION

The present invention relates to a temporary indoor barrier which prevents pets from entering designated areas of the home.

BACKGROUND OF THE INVENTION

When keeping pets indoor, there are often areas from which it is desired to restrict access by pets such as, for example, a kitchen, entry area, or other room.

Indoor barriers or fences to prevent pets from entering such areas have been reported.

In general, an indoor fence has a mounting section that can be attached to and detached from a pillar or wall. By attaching the mounting section to a pillar or wall that is opposite another pillar or wall, it is possible to block the space between such pillars or walls with the fence. An indoor pet fence has been reported in Published Unexamined Japanese Patent Application No. 2002-21376 that also has a gate that can be opened and closed with one hand.

However, an indoor pet fence such as described in Japanese Patent Application 2002-21376 is in contact with, and compressed between two walls or pillars. Accordingly, without pillars or walls that support contact with the fence on both sides thereof, the fence cannot be installed. Therefore, the fence cannot be installed in such a location as at the foot of a staircase, because of the absence of opposing pillars or walls and a problem remains as to how to secure such areas from pet entry.

In addition, because a fence is compressed between opposing walls or pillars it is not easy to remove it once it has been installed. However, it might be necessary to remove it to allow people to pass from one area to another. This operation is cumbersome.

As stated above, the indoor pet fence such as described in Japanese Patent Application 2002-21376 is cumbersome to attach or detach.

A self-supporting freestanding pet barrier is herein disclosed which has features that facilitate installation and removal, as well as the passage of human traffic when desired

DETAILED DESCRIPTION OF THE INVENTION

Figure 1:
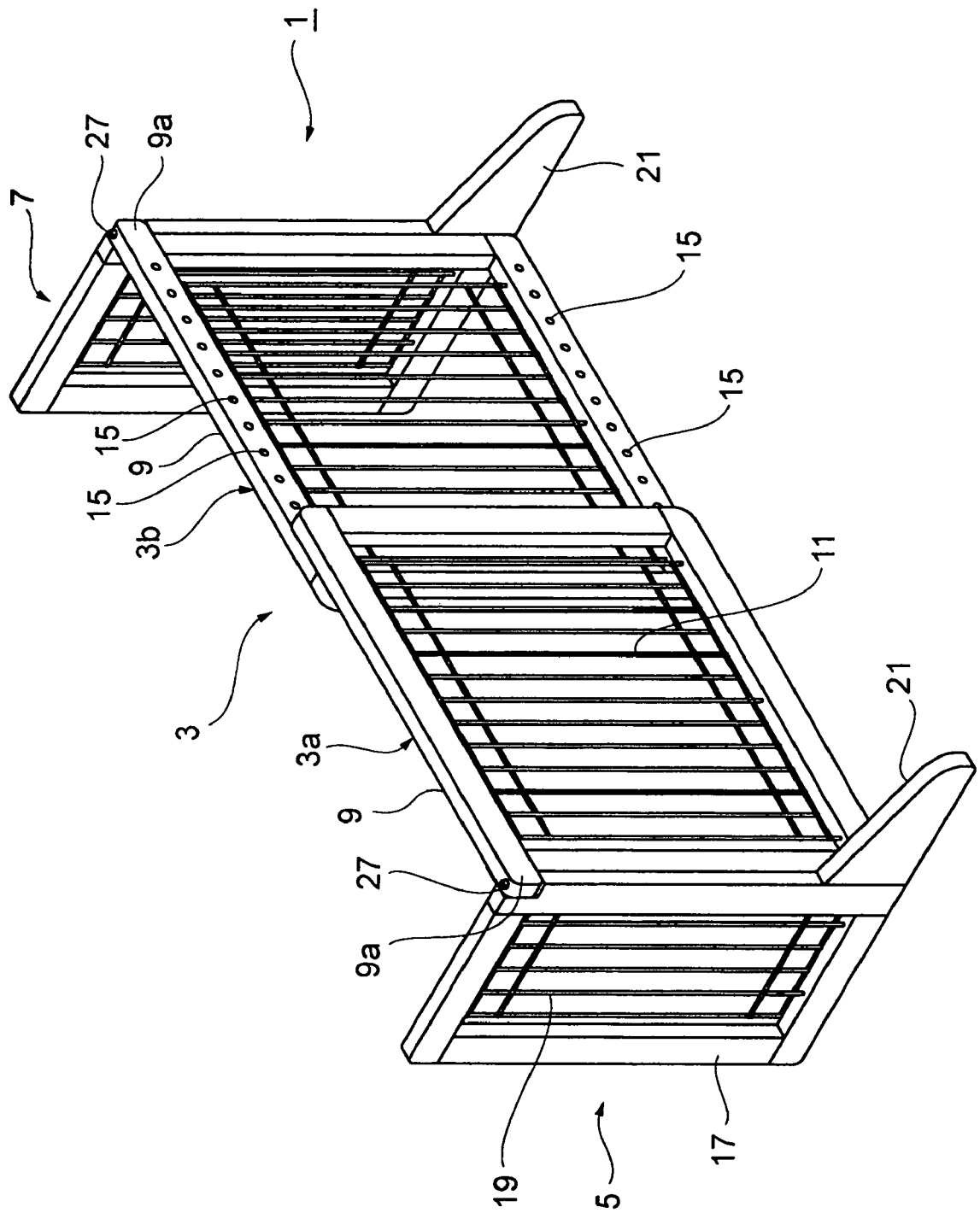
FIG. 1 is a perspective view, viewed from the front, of a freestanding pet barrier according to an embodiment of the present invention.

For a more complete understanding of the present disclosure and the advantages thereof, reference is now made to the following description, taken in connection with the accompanying drawings and detailed description, wherein like reference numerals represent like parts.

One embodiment of a freestanding pet barrier according to the present invention comprises a front panel having two vertical members and side panels attached to each of said vertical members of said front panel. In a preferred embodiment, the side panels are extended in the direction that intersects with the front panel to enable a self-supporting structure.

In examples in which the side panels are extended in the direction that intersects with the front panel to enable a self-supporting structure, the front panel and the side panels are generally located in a configuration resembling the letter-U or the letter-H when viewed in a plan view. Furthermore, the front panel and the side panels may be located in a configuration resembling the letter-U, and a support member may extend outwardly from the front panel opposite to the direction of the side panels.

The front panel described above can extend and contract in the direction of the width. Specifically, to enable the front panel to extend and contract, for example, the front panel comprises a plurality of panels which are positioned so that they overlap with each other in the anteroposterior direction and the total width of the panel can be adjusted by adjusting the length of the overlapping.

The side panels described above can be folded.

The freestanding pet barrier of the invention may comprise one or more stabilizing means as will be further described below that serve to enable the freestanding configuration or lock the desired configuration.

Furthermore, a freestanding pet barrier having the foldable side panels preferably comprises a coupling section which rotatably couples the side panel with the front panel, and a stopper which restricts rotation of the side panel when the side panel is unfolded. A specific example of the stopper is a mechanism in which (when the side panel is unfolded) a pin passes through both the side panel and the front panel via a thin hole provided on both the side panel and the front panel.

A freestanding pet barrier disclosed herein preferably has a friction reducing member or substance provided on the bottom face of the front panel and the bottom face of the side panel to prevent those panels from slipping.

Preferably, both the front panel and the side panels can be disassembled. In this embodiment, because the front panel and the side panel can be separated from each other, it is possible to quickly disassemble the freestanding pet barrier when it is stored, thereby enabling compact storage.

In a preferred embodiment, the front panel comprises a frame with wires installed in the frame, and only vertical wires are installed in the central three-fifths portion of the front panel. This construction prevents a pet from climbing onto or over the freestanding pet barrier, since it cannot boost itself by putting its feet on the vertical wires. As a result, there is no danger of the pet climbing over the freestanding pet barrier.

In a preferred embodiment, the front panel described above is of the proper height so that a person can step over the panel. When a person approaches, he or she can simply step over the front panel without needing to open and close the gates, thereby providing convenience to the user.

It is preferable in this embodiment that the front panel be set less than 65 cm high, and most preferably between 50 cm and 65 cm high in order for a person to step over it.

In another embodiment, the front panel described above has a small gate built into the front panel to allow a pet to pass through the freestanding pet barrier.

The small gate enables a pet to pass through the installed freestanding pet barrier, thereby allowing or preventing a pet from passing through to the other side of the freestanding pet barrier as necessary or desired.

In yet another embodiment, the front panel described above has a gate to allow a person to open and close it when he or she passes through the gate.

In this embodiment, because the front panel has a gate which a person can open and close when he or she goes through it, the person can pass through the panel even when it is too high to step over, thereby making it possible for a child or a physically impaired person who cannot step over the panel to pass through the freestanding pet barrier.

In a most preferred embodiment, an indoor freestanding pet barrier according to the present invention comprises a front panel and side panels attached to both sides of the front panel, wherein the side panels are extended in the direction that intersects with the front panel to enable a self-supporting structure. Accordingly, the self-supporting structure allows the freestanding pet barrier to be installed in any location.

Furthermore, since side panels are provided, it is possible to prevent a pet from entering from the direction of the sides of the front panel. That is, the side panels are not simply help the front panel to become self-supporting, but reliably prevent a pet from entering from the direction of the sides of the front panel.

Figure 2:
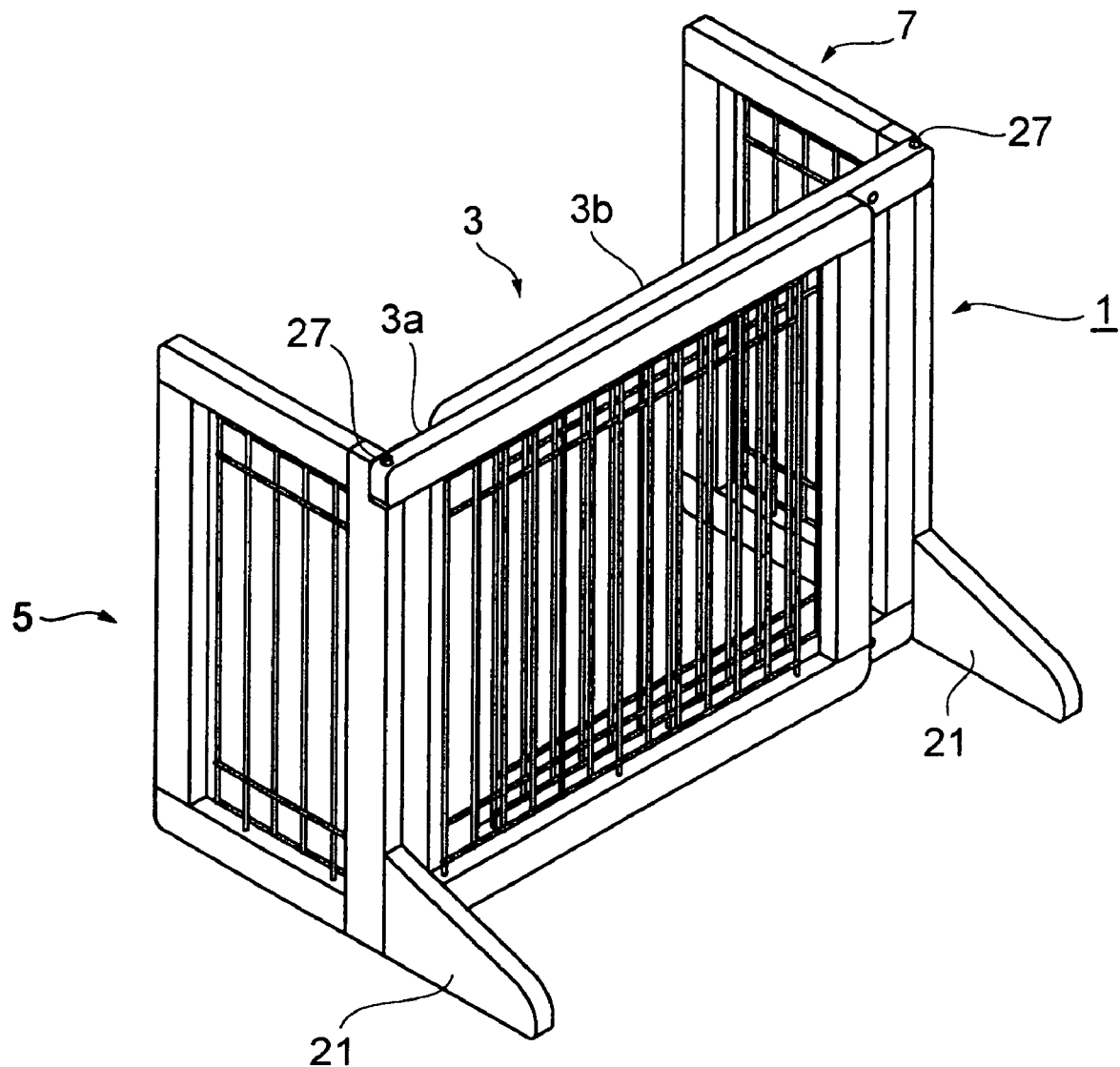
FIG. 2 is also a perspective view, viewed from the front, of a freestanding pet barrier according to an embodiment of the present invention, wherein the width of the front panel has been narrowed.
Figure 3:
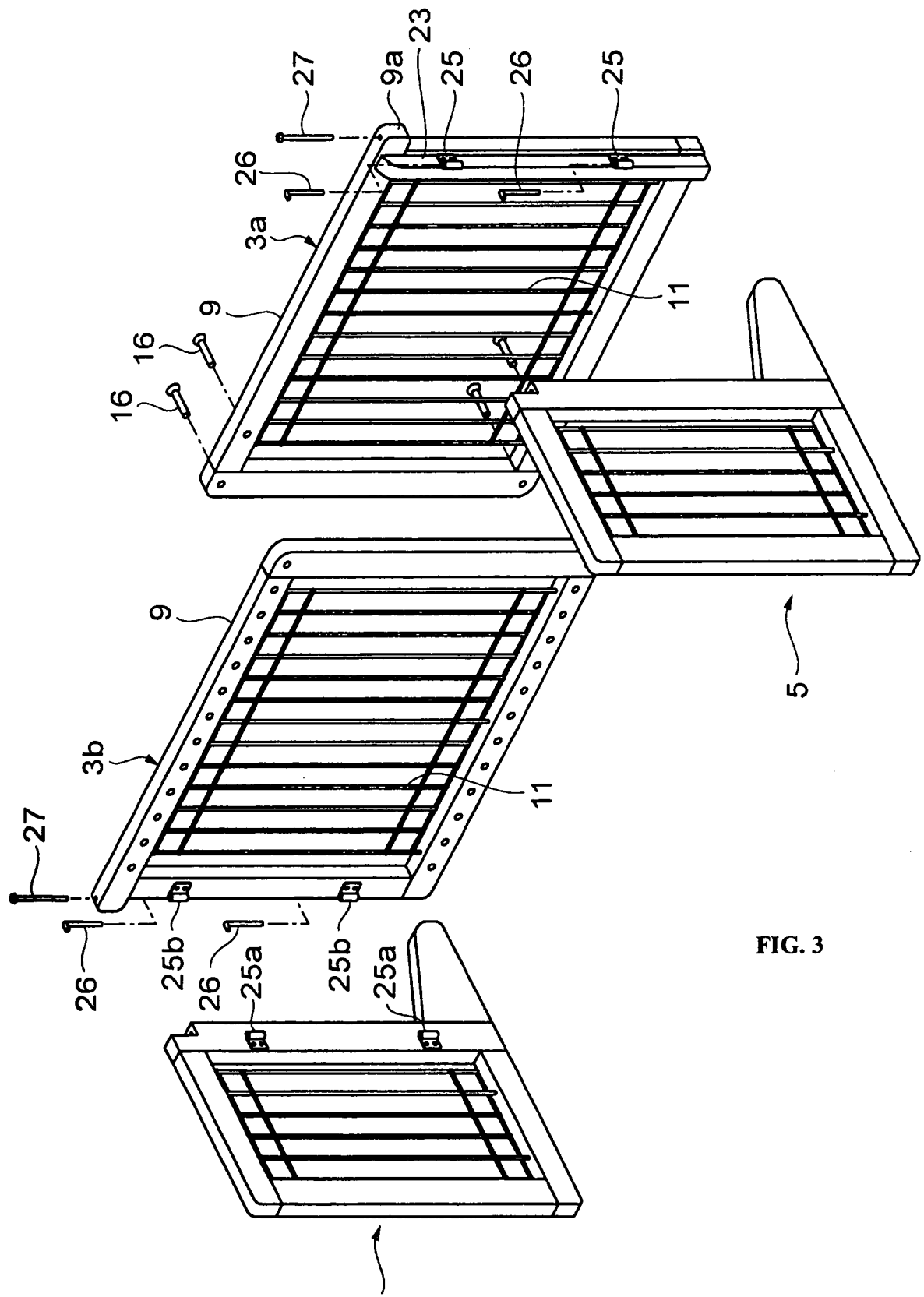
FIG. 3 is an exploded perspective view of a freestanding pet barrier according to one embodiment of the present invention.
Figure 4:
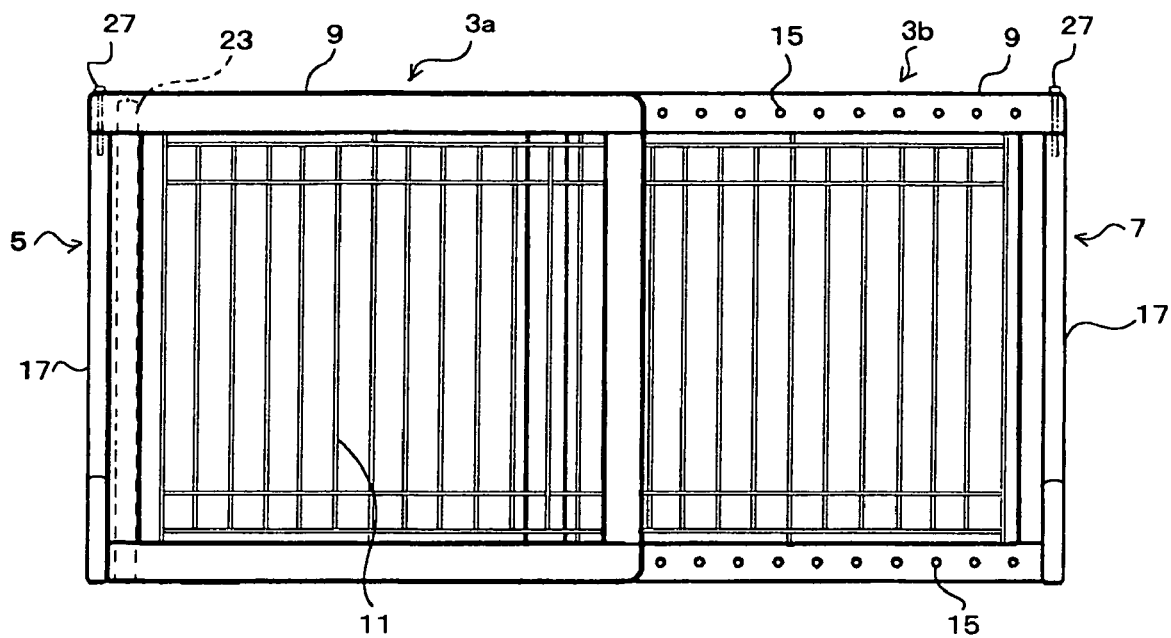
FIG. 4 is a front view of a freestanding pet barrier according to one embodiment of the present invention.

As shown in FIG. 1 through FIG. 3, a freestanding pet barrier 1 according to this embodiment comprises a front panel 3 and a pair of side panels 5 and 7 which are attached to the sides of the front panel 3 so that they can be folded and removed. Hereafter, each component will be explained in detail with reference to the drawings.

The front panel 3 comprises two panels 3a and 3b. The basic structure of the panels 3a and 3b is the same, therefore, the panel 3a will be described below and the same reference number is assigned to the identical portion of the panel 3b.

The panel 3a comprises a rectangular frame 9 which is of the proper height to control the entry of a pet and enable a person to step over it, and wires 11 installed in the frame (see FIG. 1 through FIG. 4). It is preferable that the height of the panel be 65 cm or less and more preferably set between 50 cm and 65 cm.

An extending section 9a which extends laterally by the length equivalent to the thickness of the side panel 3 is provided on an end of the upper horizontal member of the frame 9 (see FIG. 1).

Wires 11 are mainly installed vertically, and a horizontal wire is installed in an upper location as well as in a lower location of the frame 9. That is, the central three-fifths portion of the front panel is made up of only vertical wires. This prevents an indoor pet from climbing the freestanding pet barrier by obtaining a foothold on the wires.

Figure 5:
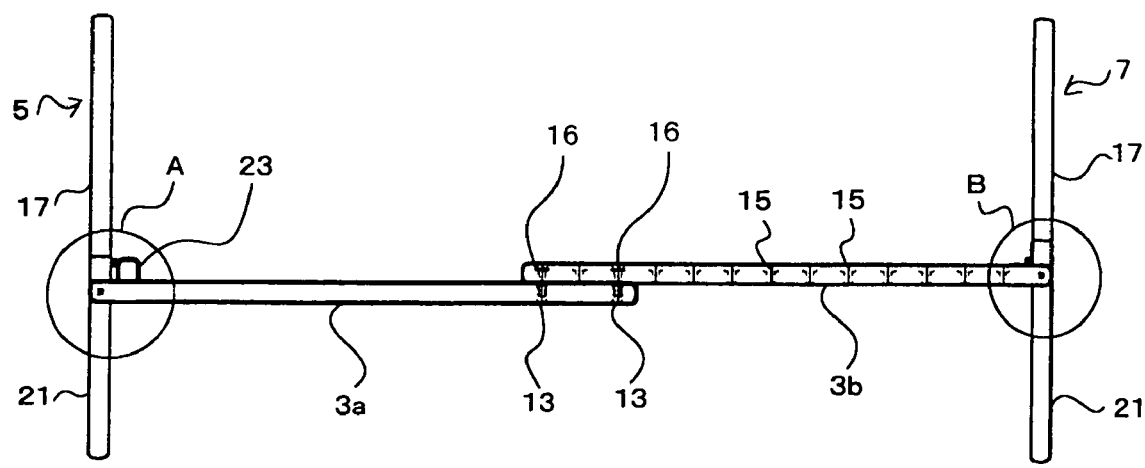
FIG. 5 is a plan view of a freestanding pet barrier according to one embodiment of the present invention.

As shown in FIG. 1 and FIG. 5, two panels 3a and 3b are located so that they partially overlap in the anteroposterior direction. The total width of the front panel can be adjusted by adjusting the length of the portion where the two panels 3a and 3b overlap in the anteroposterior direction.

Two positioning insertion nuts 13 are provided in each end of the upper and lower horizontal members that constitute the frame 9 of the anteriorly located panel 3a. See FIG. 3 and FIG. 5. Furthermore, a plurality of positioning holes 15 are provided in both the upper and lower horizontal members that constitute the frame 9 of the posteriorly located panel 3b. An interval between a plurality of positioning holes 15 provided in the posteriorly located panel 3b is half of the interval between the two positioning insertion nuts 13 provided in the anteriorly located panel 3a.

The two panels 3a and 3b partially overlap, and so that the positioning holes 15 of the posteriorly located panel 3b, are aligned with the insertion nuts 13 of the anteriorly located panel 3a so that a bolt 16 can pass through the insertion nuts 13 and the positioning holes 15 from the rear of the panel 3b, thereby making it possible to securely fix the two panels 3a and 3b in a prescribed location and adjust the width of the front panel 3 (see FIG. 3 and FIG. 5). Providing the two insertion nuts in the anteriorly located panel 3a makes it possible to securely couple the two panels. Furthermore, because the interval between two insertion nuts 13 provided in the anteriorly located panel 3a is of sufficient dimension, if a force in the anteroposterior direction is applied to the front panel 3, resistance will increase. On the other hand, an interval between positioning holes 15 provided in the posteriorly located panel 3b is about half of the interval between the insertion nuts 13 of the anteriorly located panel 3a, which makes it possible to make fine adjustments of the width.

The basic structure of the two side panels 5 and 7 that are attached to the sides of the front panel 3 is the same, therefore, only the side panel 5 will be described below.

Figure 7:
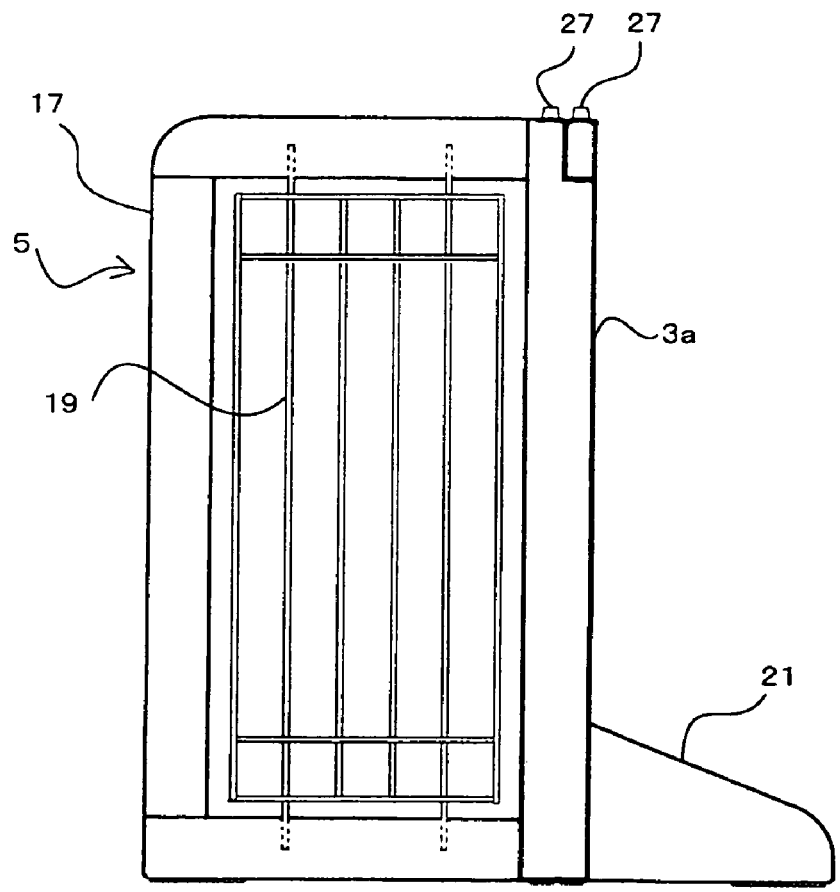
FIG. 7 is a left side view of a freestanding pet barrier according to one embodiment of the present invention.
Figure 8:
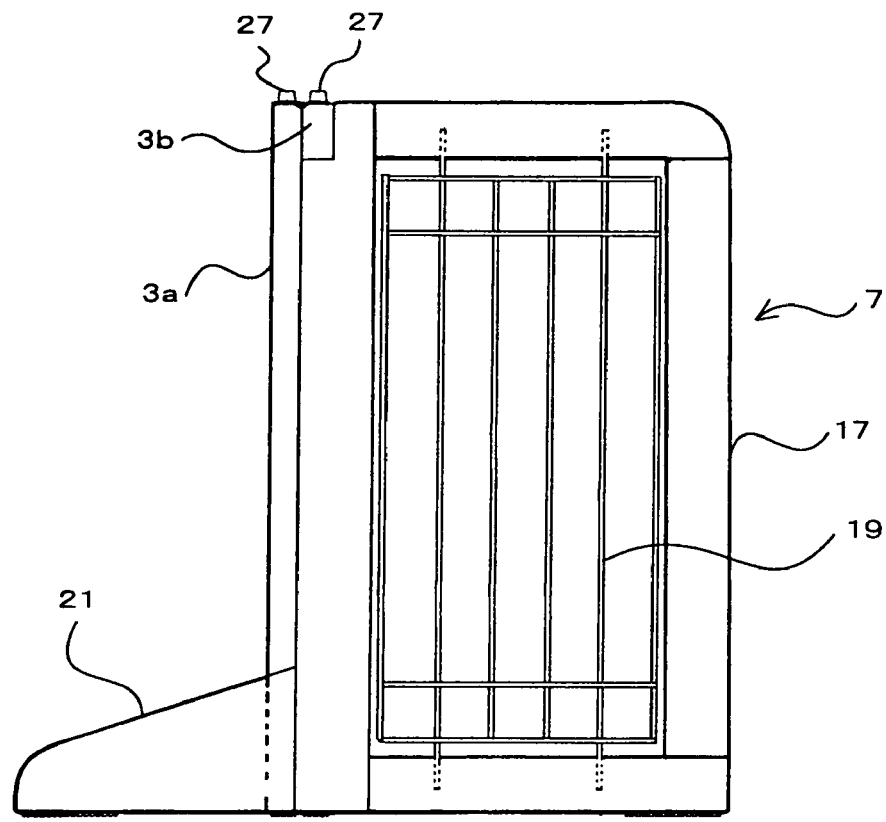
FIG. 8 is a right side view of a freestanding pet barrier according to one embodiment of the present invention.

As shown in FIG. 7, the side panel 5 comprises a nearly rectangular frame 17 and wires 19 that are installed in the frame 17. In the same manner as the front panel 3, wires 19 are mainly installed vertically, and a horizontal wire is installed in an upper location as well as in a lower location of the frame 17. That is, the central three-fifths portion of the side panel 5 is made up of only vertical wires.

A generally triangular leg 21 is provided at the lower part of the side panel 5. The leg 21 protrudes forward from the front panel 3 when a freestanding pet barrier 1 is installed. Providing the leg 21 increases stability when the indoor freestanding pet barrier 1 stands alone.

The side panel 5 is mounted to the front panel so that the side panel 5 can be folded. Specifically, the side panel 5 and the front panel 3a are rotatably connected by the hinges 25 that are provided at the upper and lower parts of the inner front-side vertical frame member of the side panel 5 and the pillar member 23 installed on the back side of the front panel 3a (see FIG. 9 and FIG. 10).

As shown in FIG. 3, hinges 25 include a first hinge 25a that is attached to the side panel (see side panel 7) and a second hinge 25b that is attached to the front panel 3a. Those hinges are provided at two locations: the upper part and the lower part of each panel. The upper first hinge 25a has an axial pin and the lower first hinge 25a has a cylindrical portion. And, both upper and lower second hinges 25b have cylindrical portions.

In the hinges 25, by inserting the upper second hinge 25b into the upper first hinge 25a and by inserting axial pins 26 into the lower first hinge 25a and the cylindrical portion of the second hinges 25b, the side panel 5 and the front panel 3a can be rotatably connected. Furthermore, when removing the front panel from the side panel, first the axial pin 26 can be removed, and while lifting the front panel 3a, the cylindrical portion of the second hinge 25b can be removed from the axial pin of the upper first hinge 25a.

Figure 9:
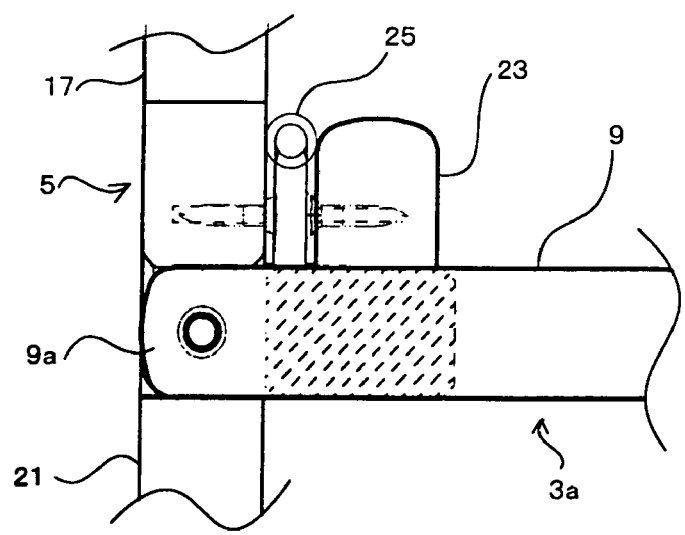
FIG. 9 is an enlarged view of portion A which is circled in FIG. 5.
Figure 11:
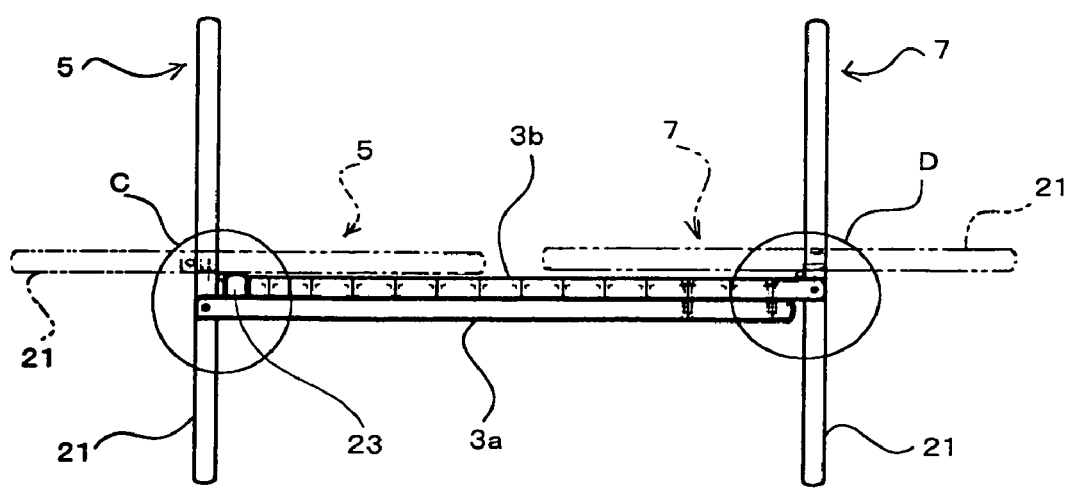
FIG. 11 is an explanatory drawings that illustrates the operation of an embodiment.
Figure 12:
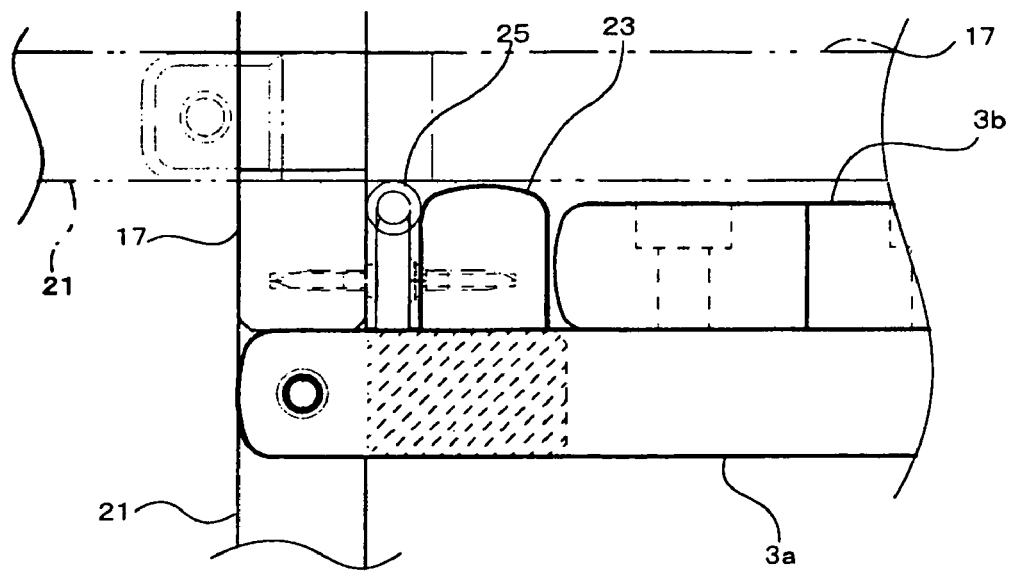
FIG. 12 is an enlarged view of portion C which is circled in FIG. 11.

The pillar member 23 installed on the back side of the front panel 3a is as thick as the front panel 3b which is posteriorly located. And, as shown in FIG. 9 and FIG. 12, the rotation center of the hinges 25 is located at the posterior side of the pillar member 23. As shown in FIG. 11 and FIG. 12, this structure creates a clearance, which is equivalent to the thickness of the pillar member 23, between the side panel 5 and the front panel 3a when the side panel 5 is folded. The posteriorly located front panel 3b can be inserted into the clearance, thereby making the freestanding pet barrier compact when it is folded.

Figure 10:
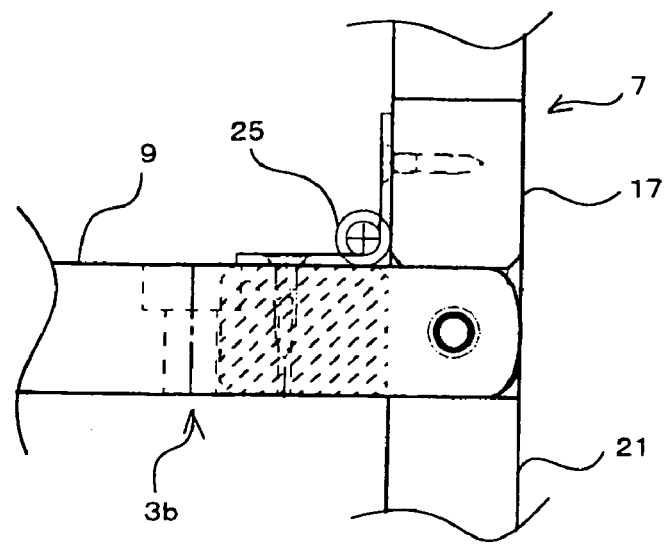
FIG. 10 is an enlarged view of portion B which is circled in FIG. 5.
Figure 13:
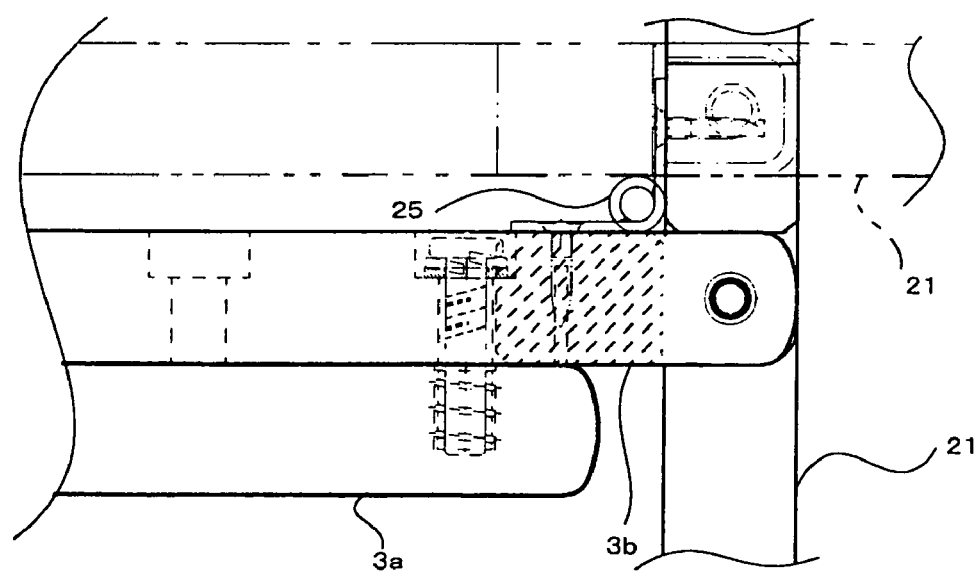
FIG. 13 is an enlarged view of portion D which is circled in FIG. 11

A pillar member is not provided on the side panel 7. As shown in FIGS. 5, 10 and 13, the side panel 7 is rotatably mounted to the front panel 3b by the hinges 25 provided on the side panel 7 and the frame 9 of the front panel 3b.

When the pet freestanding pet barrier is folded, the two side panels 5 and 7 form an almost flat plane as shown in the chain double-dotted line in FIG. 11, thereby facilitating the storage.

In one embodiment, when the freestanding pet barrier 1 is installed (see FIG. 1), by inserting a pin 27 into the frame 17 of the side panels 5 and 7 from the extending section 9a of the frame 9 of the front panel 3, it is possible to prevent the side panels 5 and 7 from rotating. That is, the pin 27 functions as a stopper according to an embodiment of the present invention.

A freestanding pet barrier 1 according to this embodiment, which is structured as stated above, can be installed at any indoor location in a generally letter-H configuration as shown in FIG. 1. Since the freestanding pet barrier 1 is self-supporting, it can be installed at a location where there are no walls or pillars on two sides, such as at the foot of a stair case. Furthermore, since side panels 5 and 7 are provided, it is possible to prevent a pet from entering from the direction of the sides of the front panel.

Figure 6:
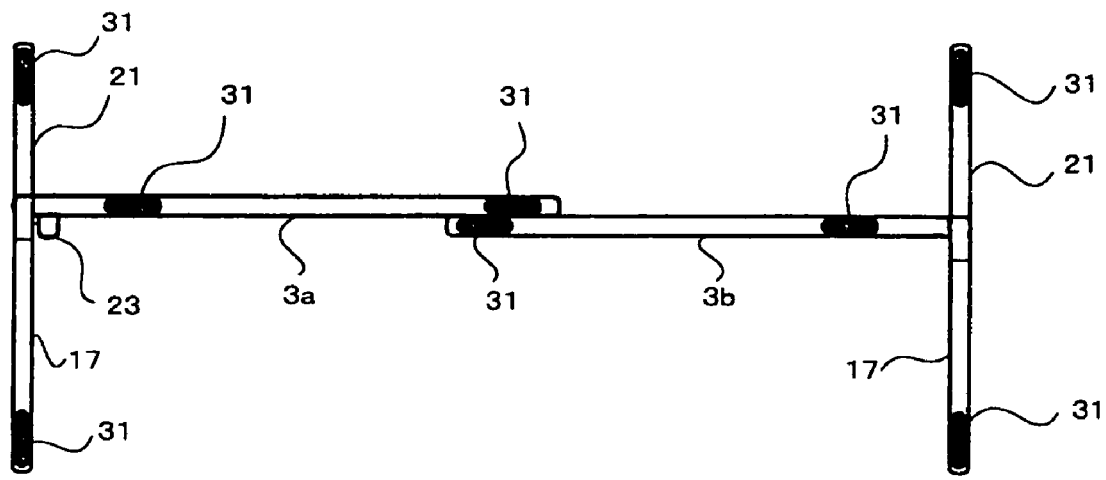
FIG. 6 is a bottom view of a freestanding pet barrier according to one embodiment of the present invention.

Furthermore, as shown in FIG. 6, a rubber friction increasing member 31 is attached to the bottom surface of the front panels 3a and 3b and the side panels 5 and 7. Therefore, the freestanding pet barrier which is not fixed to the wall or pillar is stable and will not slide.

Furthermore, since the height of the freestanding pet barrier 1 according to this embodiment is properly determined so that a person can step over the freestanding pet barrier, a person can simply step over when he or she goes through it without needing to perform any operation.

The width of the front panel 3 can be narrowed according to an installation location by simply increasing the length of the overlapping portion where the anteriorly located front panel 3a and the posteriorly located front panel 3b overlap, as shown in FIG. 2.

Furthermore, when the freestanding pet barrier is stored, it can be made compact by totally overlapping the front panels 3a and 3b, as shown in FIG. 11, and rotating the side panels 5 and 7 toward the front panel 3.

Moreover, as shown in FIG. 3, the front panels 3a and 3b and the side panels 5 and 7 can be separated from one another by simply removing the pins 26. Therefore, by disassembling the freestanding pet barrier, it can be made compact during transportation. It is also easy to assemble the pet fence.

As stated above, a freestanding pet barrier according to this embodiment makes it easy for a person to step over the freestanding pet barrier and facilitates the set-up of the freestanding pet barrier, and permits the freestanding pet barrier to be made more compact when it is stored.

Moreover, in the above embodiment, both the front panel 3 and the side panels 5 and 7 comprise a frame and wires. However, the front panel 3 and the side panels 5 and 7 can be made of wood or other board material.

Furthermore, the front panel is not intended to be limited to be a flat plane, and it can curve horizontally or vertically.

Moreover as a mechanism to adjust the width of the two front panels 3a and 3b, it is also possible to provide a long hole on either panel and fix the two panels at any position via a screw that passes through the long hole.

Figure 14:
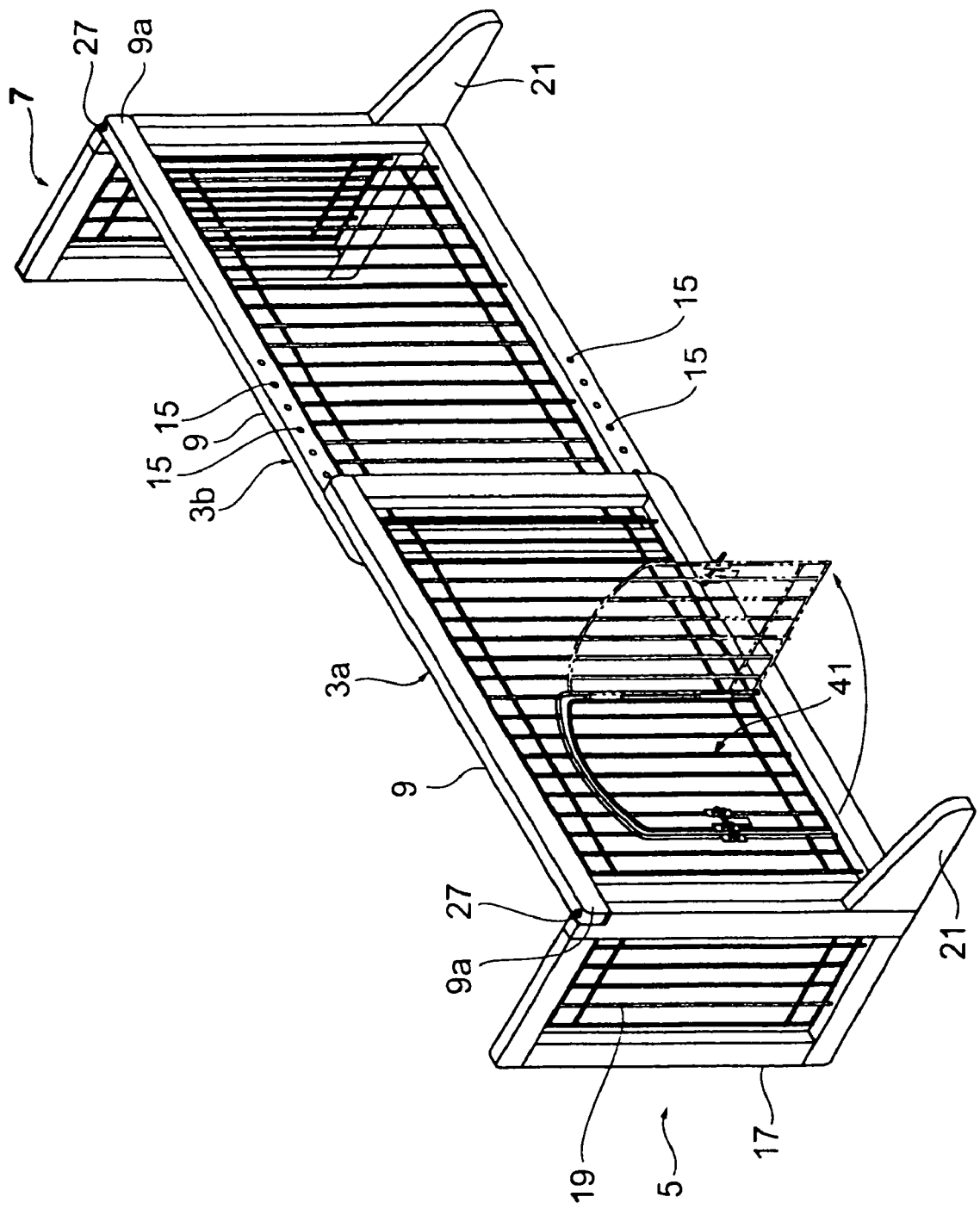
FIG. 14 is an explanatory drawing that illustrates another example of the freestanding pet barrier according to an embodiment of the present invention.

Moreover, as shown in FIG. 14, a small gate 41 may be provided on part of the front panel 3a to allow a pet to pass through the panel.

Providing the small gate 41 enables a pet to pass through the installed freestanding pet barrier, thereby allowing or preventing a pet from passing through to the other side of the freestanding pet barrier as necessary, which provides convenience for the pet owner.

Figure 15:
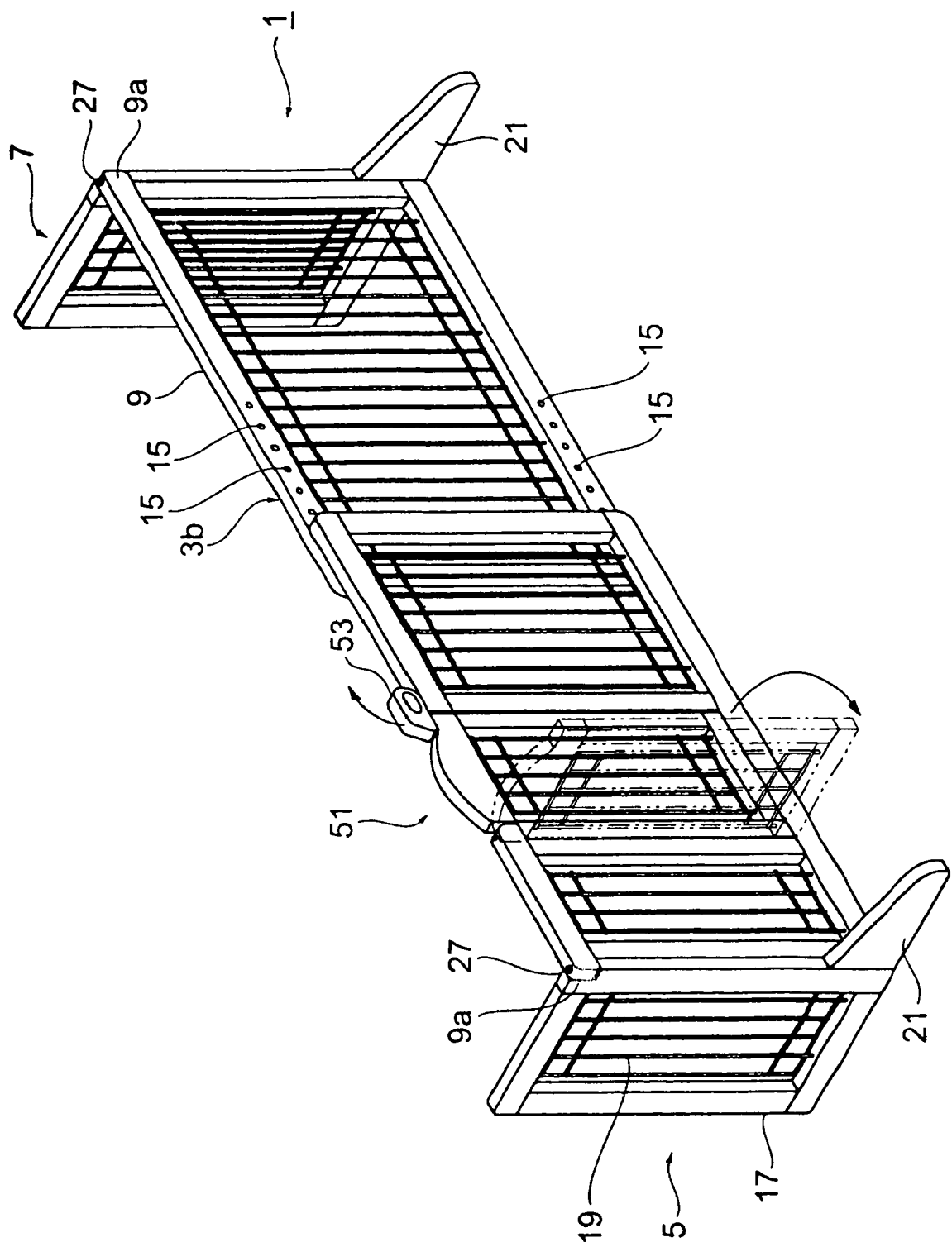
FIG. 15 is an explanatory drawing that illustrates another example of the freestanding pet barrier according to an embodiment of the present invention.

Furthermore, as shown in FIG. 15, the front panel 51 may have a gate that can be opened and closed when a person goes through it. The gate can be opened by rotating the handle 53 in the direction indicated by the arrow in the drawing.

Because the front panel has a gate which a person can open and close when he or she goes through, the person can pass through the panel even when it is too high to step over, thereby making it possible for a child or a physically impaired person who cannot step over the front panel to pass through the panel.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

We claim:

1. A self-supporting pet barrier, comprising:

a front panel which comprises a top horizontal member, a bottom horizontal member comprising a floor-contacting surface, and two flanking vertical members attached to, and extending between, said top and bottom horizontal members, each of said flanking vertical members further comprising a side panel receiving portion, wherein the top horizontal member, the bottom horizontal member, and the two flanking vertical members define an open space interrupted by vertical members between the two flanking vertical members with only the interrupting vertical members in a central three-fifths portion of the open space;

at least two generally rectangular side panels, each side panel comprising a side panel top horizontal member, a side panel bottom horizontal member comprising a floor-contacting surface, and first and second side panel vertical members attached to, and extending between, said side panel top horizontal member and said side panel horizontal bottom member, each of said first side panel vertical members further comprising a front panel attaching portion;

at least one leg coupled to said front panel having a floor-contacting surface and extending from a front side of said front panel;

said front panel attaching portion attached to said side panel receiving portion;

said side panels configured to be extended in use in an open configuration in the direction generally perpendicular to said front panel to stabilize said self supporting pet barrier in use;

said self supporting pet barrier adapted to rest on a floor through contact between said floor-contacting surfaces of said bottom members and said floor, and to stand upright thereon without securing said pet barrier to a structure external to said barrier; said at least one leg is configured to assist with maintaining said self supporting pet barrier to stand upright but is not configured to obstruct a path of a house pet, wherein said front panel comprises a first anterior section and a second posterior section adjustably secured to said first anterior section so that the width of said front panel can be adjusted by moving the position of said first anterior section substantially parallel to said second posterior section or vice versa.

2. The self supporting pet barrier according to claim 1, wherein said side panel receiving portion comprises first and second tubular members, and said front panel attaching portion comprises third and fourth tubular members, and wherein said first tubular member further comprises an upwardly extending pin adapted to removably fit into said third tubular member, and wherein said second tubular member is adapted to fit adjacent said fourth tubular member, and wherein a removable securing pin can be removably secured inside said second and fourth tubular members thereby forming rotatable hinges between said front and side panels, said rotatable hinges enabling said side panel to be positioned from a first position folded against the back of said front panel to a generally perpendicular position with respect to said front panel.

3. The self supporting pet barrier according to claim 1, further comprising a removable stopper which secures said side panel in a rotation-restricting position when said stopper is installed.

4. The self supporting pet barrier according to claim 3, wherein said top horizontal member of said front panel defines a first stopper-receiving tunnel, and wherein said first side panel vertical member is notched, thereby defining a notched area adapted to receive said top horizontal member; and wherein a second stopper-receiving tunnel is defined by said first side panel vertical member in said notched area, whereby said first and second stopper-receiving tunnels line up adjacent to one another when said top horizontal member of said front panel is received in said notched area of said side panel, whereupon said stopper pin may be inserted in said first stopper receiving tunnel and extend into said second stopper receiving tunnel thereby fixing said side panel in a rotation-restricting position.

5. The self supporting pet barrier according to claim 1, wherein said floor contacting surfaces further comprise a friction increasing substance.

6. The self supporting pet barrier according to claim 1, wherein the open space is further interrupted by horizontal members between the top horizontal member and the bottom horizontal member in a bottom or top one-fifth of the open space.

7. The self-supporting pet barrier of claim 6, wherein the interrupting vertical members and the interrupting horizontal members are wires.

8. The self supporting pet barrier according to claim 1 wherein said front panel has a height of 65 cm or less.

9. The self-supporting pet barrier according to claim 1, wherein a gate is formed in said front panel and attached thereto by hinges and a locking means, whereupon release of said locking means said gate can be swung open so that a pet can pass through said gate.

10. The self-supporting pet barrier according to claim 1, wherein said front panel further comprises a hinged portion which can open and close to permit a person to pass through said barrier without having to step over it.

11. The self supporting pet barrier of claim 1 which is adapted to be disassembled for transportation or storage in a generally planar configuration, wherein said front panel attaching portion and said side panel receiving portion comprise connecting means and complementary connecting means adapted to removably secure said side panel to said front panel, so that said side panels are detachable from and reattachable to said front panel.

12. The self supporting pet barrier of claim 1 which is adapted for transportation or storage in a generally planar configuration, wherein said side panels are attached to said front panel by one or more hinges which permit said side panels to be folded flat against said front panel to form said generally planar configuration.

13. The self-supporting pet barrier of claim 1, wherein for each side panel, the side panel top horizontal member, the side panel bottom horizontal member and the first and second side panel vertical members define a second open space interrupted by vertical members between said first and second side panel vertical members.

14. A method for temporarily restricting access to an indoor area, comprising the steps of providing a freestanding pet barrier comprising at least two front panels, at least two side panels, and at least one barrier stabilizer, each having bottom floor-contacting surfaces, said front panels adjustably coupled together to allow adjustment of an extent to which said at least two front panels overlap and extend beyond each other, said side panels rotatably attached to said front panels so that said side panels may be positioned in an open and freestanding configuration generally perpendicular to said front panels in use, said front panels and said side panels comprising vertical interrupting members with only the vertical members in a central three-fifths portion of said front panels and said side panels, said at least one barrier stabilizer coupled to and extending from at least one of said at least two front panels.

15. The method of claim 14, wherein said front panels and said side panels further comprise horizontal interrupting members in a top or bottom one-fifth portion of said front panels and said side panels.

16. The method of claim 15, wherein said front panels and said side panels each comprise a top horizontal member, a bottom horizontal member, and two flanking vertical members attached to and extending between said top and bottom horizontal members, and wherein said vertical interrupting members are between said flanking vertical members and said horizontal interrupting members are between said top and bottom horizontal members.

17. The method of claim 16, wherein said vertical interrupting members and said horizontal interrupting members are wires.

18. The method of claim 14, wherein said barrier stabilizer does not impede a path of a house pet.

19. The method of claim 12, wherein said barrier stabilizer does not impede a path of a house pet.

20. A self-supporting house pet barrier for use on a surface, comprising:
a first front barrier for blocking the path of a house pet, said first barrier having a front side and a back side and having an inner end and an outer end;
a second front barrier for blocking the path of a house pet, said second front barrier having a front side and a back side and having an inner end and an outer end, wherein said inner end of said first front barrier extends beyond said inner end of said second front barrier, and wherein said first and second front barriers are configured to allow adjustment of the extent to which said inner end of said first front barrier overlaps and extends beyond said inner end of said second front barrier in steps with physical features of the first and second front barriers;
a first side barrier having two ends; and
a second side barrier having two ends;
said first front barrier being coupled to said first side barrier such that one of said two ends of said first side barrier is located beyond said back side of said first front barrier and the other of said two ends of said first side barrier is coupled to said first front barrier;
said second front barrier being coupled to said second side barrier such that one of said two ends of said second side barrier is located beyond said back side of said second front barrier and the other of said two ends of said second side barrier is coupled to said second front barrier;
a first leg coupled to said first front barrier and extending from said front side of said first front barrier; and
a second leg coupled to said second front barrier and extending from said front side of said second front barrier,
wherein said first and second legs are configured to assist with maintaining said first front barrier and said second front barrier in a vertical position but are not configured to obstruct the path of a house pet, and
wherein said first front barrier, said second front barrier, said first side barrier, and said second side barrier are coupled to form an open self-supporting barrier in use.

21. The self-supporting house pet barrier of claim 20, wherein:
said first front barrier and said first side barrier are substantially perpendicular to one another; and
said second front barrier and said second side barrier are substantially perpendicular to one another.

22. The self supporting house barrier of claim 20, further comprising a third front barrier for blocking the path of a house pet and coupled to said first front barrier and said second front barrier.

23. The self supporting house barrier of claim 22, wherein:
said third front barrier has a first end and a second end; and
said first end of said third front barrier overlaps said inner end of said first front barrier and said second end of said third front barrier overlaps said inner end of said second front barrier.

24. The self-supporting house barrier of claim 20, wherein said first side barrier is coupled to said first front barrier by a first hinge and said second side barrier is coupled to said second front barrier by a second hinge.

25. The self-supporting barrier of claim 20, wherein:
said first side barrier and said first leg are configured to rotate together between a position generally perpendicular to said first front barrier and a position generally parallel to said first front barrier; and
said second side barrier and said second leg are configured to rotate together between a position generally perpendicular to said second front barrier and a position generally parallel to said second front barrier.

26. The self-supporting barrier of claim 20, further comprising:
a first stopper coupled to said first side barrier to prevent rotation of said first side barrier relative to said first front barrier; and
a second stopper coupled to said second side barrier to prevent rotation of said second side barrier relative to said second front barrier.

27. The self-supporting pet barrier of claim 20, wherein:
said first side barrier rests on the floor via one or more intermediate members; and
said second side barrier rests on the floor via one or more intermediate members.

28. The self-supporting pet barrier of claim 27, wherein:
said one or more intermediate members of said first side barrier comprise friction increasing members; and
said one or more intermediate members of said second side barrier comprise friction increasing members.

29. The self-supporting pet barrier of claim 20, wherein at least one of said first and second front barriers has a gate therein.

30. The self-supporting pet barrier of claim 29, wherein said gate is sized to allow a person to pass through when said gate is opened.

31. The self supporting pet barrier of claim 29, wherein said gate is sized to allow a house pet to pass through when said gate is opened.

32. The freestanding house pet gate of claim 20, wherein:
said physical features of said first front barrier comprise a plurality of openings;
said physical features of said second front barrier comprise at least one opening;
at least one of said plurality of openings in said first front barrier aligns in steps with the at least one opening in said second front barrier based on the extent to which said inner end of said first front barrier extends beyond said inner end of said second front barrier; and
a first connecting member, said first connecting member disposed within said aligned openings of said first and second front barriers.

33. The freestanding house pet gate of claim 32, wherein:
said plurality of openings of said first front barrier comprise a plurality of openings at a top of said first front barrier and a plurality of openings at a bottom of said first front barriers;
said at least one opening of said second front barrier comprises at least one opening at a top of said second front barrier and at least one opening at a bottom of said second front barrier;
at least one pair of said plurality of openings at the top of said first front barrier and said plurality of openings at the bottom of said first front barrier aligns in steps with a pair of the at least one opening at the top of said second front barrier and the at least one opening at the bottom of said second front barrier;
a plurality of connecting members disposed within said aligned pairs of openings.

34. The freestanding house pet gate of claim 32, wherein:
said at least one opening in said second front barrier comprises at least two openings;
a pair of said plurality of openings in said first front barrier aligns in steps with the at least two openings in said second front barrier based on the extent to which said inner end of said first front barrier extends beyond said inner end of said second front barrier; and
a plurality of connecting members disposed within said aligned pairs of openings of said first and second front barriers.

35. A self-supporting house pet barrier, comprising:
a front barrier configured to block the path of a house pet, said front barrier having a front side and a back side, wherein said front barrier comprises two panel portions adjustably coupled together to allow adjustment of an extent to which said two panel portions overlap and extend beyond each other;
a first stabilizing member having two ends; and
a second stabilizing member having two ends;
said front barrier being coupled to said first stabilizing member such that one of said two ends of said first stabilizing member is located beyond said back side of said front barrier and the other of said two ends of said first stabilizing member is coupled to said front barrier;
said front barrier being coupled to said second stabilizing member such that one of said two ends of said second stabilizing member is located beyond said back side of said front barrier and the other of said two ends of said second stabilizing member is coupled to said front barrier;
a first leg coupled to said front barrier and extending from said front side of said front barrier; and
a second leg coupled to said front barrier and extending from said front side of said front barrier,
wherein said first and second legs are configured to assist with maintaining said front barrier in a vertical position,
wherein said front barrier, said first stabilizing member, and said second stabilizing member are coupled to form an open self-supporting barrier in use, and
wherein said two panel portions of said front barrier, said first stabilizing member, and said second stabilizing member each comprise a frame defining an open space interrupted by vertical members with only the vertical members in a central three-fifths portion of the open space.

36. The self-supporting house pet barrier of claim 35, wherein the open space is further interrupted by horizontal members in a top or bottom one-fifth portion of the open space.

* * * * *